(12) United States Patent
Tanaka et al.

(10) Patent No.: US 11,581,988 B2
(45) Date of Patent: Feb. 14, 2023

(54) TRANSMITTING APPARATUS, RECEIVING APPARATUS, AND TRANSMISSION SYSTEM

(71) Applicant: NIPPON TELEGRAPH AND TELEPHONE CORPORATION, Tokyo (JP)

(72) Inventors: Takafumi Tanaka, Musashino (JP); Tetsuro Inui, Musashino (JP); Akira Hirano, Musashino (JP); Yoshiaki Yamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/257,759

(22) PCT Filed: Jun. 24, 2019

(86) PCT No.: PCT/JP2019/024887
§ 371 (c)(1),
(2) Date: Jan. 4, 2021

(87) PCT Pub. No.: WO2020/008929
PCT Pub. Date: Jan. 9, 2020

(65) Prior Publication Data
US 2021/0160017 A1 May 27, 2021

(30) Foreign Application Priority Data
Jul. 6, 2018 (JP) .............................. JP2018-129373

(51) Int. Cl.
*H04L 1/22* (2006.01)
*H04L 1/00* (2006.01)
*H04L 1/1809* (2023.01)

(52) U.S. Cl.
CPC .............. *H04L 1/22* (2013.01); *H04L 1/0007* (2013.01); *H04L 1/1809* (2013.01)

(58) Field of Classification Search
None
See application file for complete search history.

(56) References Cited

U.S. PATENT DOCUMENTS

2010/0313093 A1* 12/2010 Takaku ............. H03M 13/2703
714/746
2012/0082448 A1* 4/2012 Bouda ................. H04J 14/0221
398/5

(Continued)

FOREIGN PATENT DOCUMENTS

JP        2006186527 A    7/2006
JP         3877576 B2 *  2/2007

(Continued)

*Primary Examiner* — The Hy Nguyen

(57) ABSTRACT

A transmission device includes a frame processing unit, a redundant channel processing unit, a transmission and reception unit, and a channel selection unit. The frame processing unit generates division frames, adds error detection signals to the division frames, and outputs the division frames to which the error detection signals are added to a plurality of data channels. The redundant channel processing unit generates, from the division frames, one or more redundant frames including restoration information that enables restoration of the division frames, and outputs the generated redundant frames to a data channel. The transmission and reception unit outputs the division frames and the redundant frames to a transmission line. The channel selection unit allocates the division frames and the redundant frames to allocable transmission and reception units.

2 Claims, 6 Drawing Sheets

(56) References Cited

U.S. PATENT DOCUMENTS

2013/0039643 A1* 2/2013 Tokura ................ H04J 14/0297
398/79
2020/0287661 A1* 9/2020 Maierbacher ........... H04J 14/02

FOREIGN PATENT DOCUMENTS

| JP | 2009159440 | A | * | 7/2009 | | |
| JP | 2010161673 | A | | 7/2010 | | |
| JP | 201417637 | A | | 1/2014 | | |
| JP | 2016103762 | A | | 6/2016 | | |
| JP | 2016208190 | A | | 12/2016 | | |
| WO | WO-2015194217 | A1 | * | 12/2015 | ............. | H04L 29/00 |

\* cited by examiner

TRANSMITTING APPARATUS, RECEIVING APPARATUS, AND TRANSMISSION SYSTEM

CROSS-REFERENCE TO RELATED APPLICATIONS

This application is a 371 U.S. National Phase of International Application No. PCT/JP2019/024887, filed on Jun. 24, 2019, which claims priority to Japanese Application No. 2018-129373 filed on Jul. 6, 2018. The entire disclosures of the above applications are incorporated herein by reference.

TECHNICAL FIELD

The present invention relates to a transmission device, a reception device, and a transmission system.

BACKGROUND ART

In order to cope with large traffic capacity in a communication network, a method of dividing a frame generated from a main signal in parallel, allocating the divided frames to a plurality of data channels, and transmitting the frames has been commonly used in a transmission system. Meanwhile, a transmission and reception unit that generates the data channels is constantly reliable regardless of the traffic capacity, and thus the probability that any of a plurality of the transmission and reception units fails increases in proportion with an increase in the number of parallel data channels accompanying an increase in traffic.

In order to cope with the failure described above, a method of performing redundant processing on frames generated from a client signal, adding the frames to the data channels included in the main signal, and transmitting the data channels as redundant channels in parallel has been derived (Patent Literature 1). With this method, in a configuration in which the frames are allocated to the data channels by the plurality of transmission and reception units, if a failure occurs in a data channel at any location, the failed data channel is detected. In this method, the frame included in the failed data channel is restored from the frame included in the data channel that has not failed and the restoration information included in the redundant channel. Thus, even if a failure occurs in any transmission and reception unit or transmission line, communication can be continued without causing an instantaneous interruption of communication.

CITATION LIST

Patent Literature

Patent Literature 1: JP 2016-208190 A

SUMMARY OF THE INVENTION

Technical Problem

However, in the transmission method according to the related art, there is a problem in that the transmission and reception unit may not be efficiently used due to a fixed transmission and reception unit being allocated to the generated division frame.

FIG. 6 is a schematic diagram illustrating an example for describing the problem according to the related art. In the illustrated situation, a client 1 has two data channels that transmit data and one redundant channel that is switched when either of the data channels fails. A client 2 has two data channels and two redundant channels. Here, when a failure occurs in one transmission and reception unit of the data channels of the client 1, communication interruption can be prevented by using the redundant channel of the client 1. Here, redundancy of the client 1 becomes zero by using the redundant channel. In order to avoid the redundancy of the client 1 being zero, one transmission and reception unit of the two redundant channels of the client 2 may be shared with the client 1 (allocations indicated by dashed lines in FIG. 6). When the transmission and reception unit can be shared, the clients 1 and 2 can secure the redundant channel. However, when the transmission and reception unit is fixedly configured for each individual client or when the clients are configured for different destinations, the transmission and reception unit allocated to the redundant channel may not be allocated to an available channel generated by the failure of the transmission and reception unit.

The present invention has been made in view of the above problem, and an object of the present invention is to provide a transmission device, a reception device, and a transmission system capable of making configurations of a data channel and a redundant channel flexible and increasing use efficiency of a transmission and reception unit.

Means for Solving the Problem

[1] In order to solve the problem, a transmission device according to an aspect of the present invention includes a frame processing unit configured to generate division frames by dividing a frame into one or more division frames, add error detection signals to the generated division frames, respectively, and output the division frames to which the error detection signals are added to a plurality of data channels, a redundant channel processing unit configured to generate, from the division frames, one or more redundant frames including restoration information that enables restoration of the division frames when an error of the division frames is detected, and output the generated redundant frames to the plurality of data channels, a transmission and reception unit configured to output the division frames output from the frame processing unit and the redundant frames output from the redundant channel processing unit to a transmission line, and a channel selection unit configured to allocate the division frames and the redundant frames to allocable transmission and reception units.

[2] According to the aspect of the present invention, the transmission device further includes a redundant channel processing group including at least one of the redundant channel processing units. Two or more unit of the frame processing units share the redundant channel processing group, and the redundant channel processing group is configured to generate a number of the redundant frames with a number of redundant frames generable by the redundant channel processing group as an upper limit based on the division frames output from any of the frame processing units.

[3] A reception device according to another aspect of the present invention includes a transmission and reception unit configured to receive, as input from a transmission line, division frames obtained by dividing a frame into one or more division frames and adding error detection codes, or a redundant frame generated so as to include restoration information that enables restoration of the division frame when a transmission error of the division frame occurs, a frame processing unit configured to perform error detection processing by using the error detection code added to the division frame transmitted from the transmission and reception unit, output the frame based on the division frame when an error is not detected, and output the frame based on the division frame restored by using the redundant frame when an error is detected, and a redundant channel processing unit configured to, when the frame processing unit detects the error based on the error detection code, restore the division frame of a data channel on which an abnormality is detected based on the restoration information included in the redundant frame and the division frame of a data channel on which an abnormality is not detected.

[4] A transmission system according to still another aspect of the present invention includes the transmission device according to [1] or [2], the reception device according to [3], and an operation system configured to configure the number of redundant channels transmitted from the data channel processing unit in the transmission device and the transmission and reception unit selected by the channel selection unit in the transmission device for the division frames transmitted from the frame processing unit in the transmission device.

Effects of the Invention

According to the present invention, the plurality of division frames generated from the main signal and the frame included in the redundant channel share the plurality of transmission and reception units. Thus, each of the division frames is allocated to any data channel generated in the transmission and reception unit, and any number of redundant channels are given to the data channels. Accordingly, the data channel and the redundant channel can be flexibly and efficiently configured without causing an instantaneous interruption.

DESCRIPTION OF EMBODIMENTS

Hereinafter, embodiments of the present invention will be described with reference to the drawings.

First Embodiment

Figure 1:
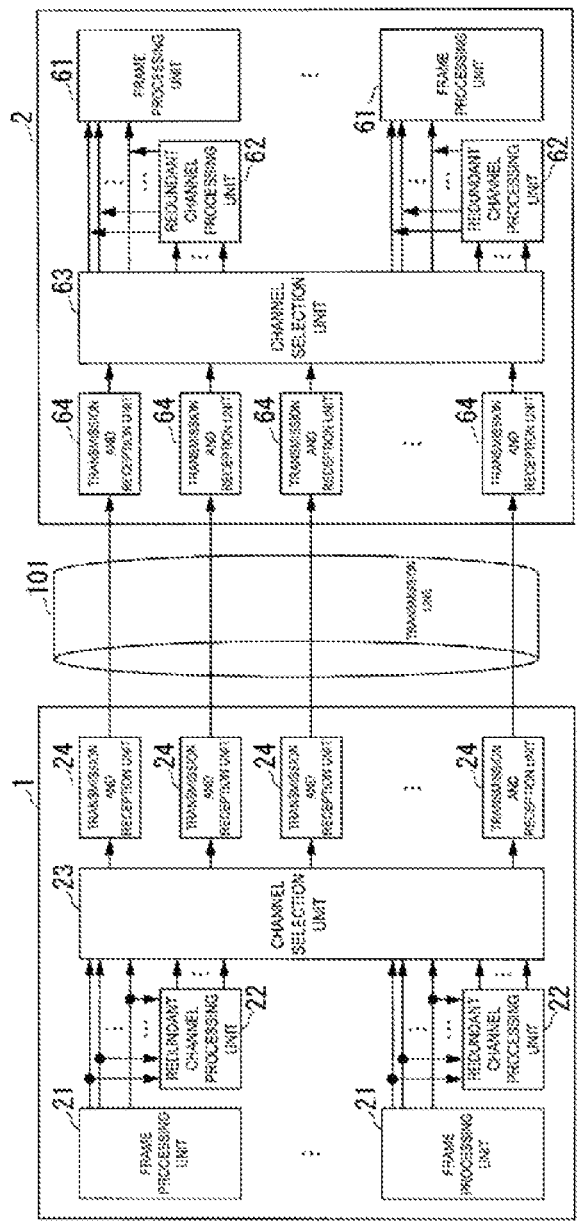
FIG. 1 is a block diagram illustrating a schematic functional configuration of a transmission system according to a first embodiment of the present invention.

FIG. 1 is a block diagram illustrating a schematic functional configuration of a transmission system according to a first embodiment. As illustrated in this diagram, the transmission system includes a transmission line 101 and communication node devices 1 and 2 at endpoints of the transmission line 101. The communication node device 1 is a transmission-side communication node device (transmission device), and the communication node device 2 is a reception-side communication node device (reception device). Although FIG. 1 illustrates that a signal flows in only a single direction (direction from the communication node device 1 to the communication node device 2), the communication node device has functions of both the transmission side and the reception side, and thus, bi-directional communication can be easily achieved.

The communication node device 1, which is the transmission side, includes a plurality of frame processing units 21, a plurality of redundant channel processing units 22, a channel selection unit 23, and a plurality of transmission and reception units 24.

The communication node device 2, which is the reception side, includes a plurality of frame processing units 61, a plurality of redundant channel processing units 62, a channel selection unit 63, and a plurality of transmission and reception units 64.

In the present embodiment, one redundant channel processing unit 22 is provided for each frame processing unit 21 in the communication node device 1. In the communication node device 2, one redundant channel processing unit 62 is provided for each frame processing unit 61.

Functions of the units constituting the communication node device 1 (transmission side) are as follows.

Each frame processing unit 21 generates one or more divided division frames based on a client signal (frame before being divided) input to the transmission system. Here, the frame processing unit 21 adds an error detection signal to the generated division frame. By adding this error detection signal is added the reception-side communication node device 2 can detect a channel on which a failure occurs. The frame processing unit 21 outputs a division frame to which the error detection signal is added to a plurality of data channels.

The redundant channel processing unit 22 generates one or more redundant frames based on the division frame generated by the frame processing unit 21. The redundant frames include restoration information available in the reception-side communication node device 2. When a failure is detected on part of the data channels, the reception-side communication node device 2 restores a transmission frame included in the channel on which the failure is detected by using a normal data channel in which a failure is not detected and the restoration information included in the redundant frames. In an identical manner as the division frame, an error detection code may be added to each redundant frame. The number of redundant channels generable by the redundant channel processing unit 22 is equal to or greater than 1. When the number of redundant channels is greater than 1, the redundant channel processing unit 22 may form a plurality of redundant channels by duplicating one redundant frame, and may use M-out-of-N coding.

That is, the redundant channel processing unit 22 generates, from the division frame, one or more redundant frames including the restoration information that enables restoration of the division frame when an error of the division frame is detected, and outputs the generated redundant frame to the data channel.

The channel selection unit 23 accommodates a plurality of division frames generated by the frame processing units 21 based on the client signal and a plurality of redundant frames generated by the redundant channel processing unit 22, and allocates these frames to the transmission and reception units 24, respectively. The transmission and reception units selected as allocation destinations of the frames by the channel selection unit 23 are optional. For example, the frames generated by a certain frame processing unit 21 may be allocated to two transmission and reception units 24, and the frames generated by another frame processing unit 21 may be allocated to another transmission and reception unit 24 between the two transmission and reception units 24. That is, the channel selection unit 23 allocates the division frames and the redundant frames to allocable transmission and reception units 24.

The transmission and reception units 24 transmit the allocated frames to the transmission line. Each transmission and reception unit 24 may have a function of adding an error correcting code by forward error correction (FEC) when the frame is transmitted.

That is, each transmission and reception unit 24 outputs the division frame output from the frame processing unit 21 and the redundant frame output from the redundant channel processing unit 22 to the transmission line.

A transmission signal transmitted from the transmission and reception unit 24 reaches the transmission and reception unit 64 of the reception-side communication node device 2, which is a destination, via the transmission line. When there is a plurality of nodes which may be destinations, in a transmission line section, the degree of each of the transmission and reception units is selected by a cross connection unit (not illustrated).

The reception-side communication node device 2 performs reception processing opposite to the processing in the transmission-side communication node device 1. That is, the processing is performed as follows.

The transmission and reception unit 64 receives the transmission signal. The transmission and reception unit 64 performs error correction processing as necessary. The transmission and reception unit 64 delivers the received transmission frame and redundant frame to the channel selection unit 63. That is, the transmission and reception unit 64 inputs, to the channel selection unit 63 from the transmission line, the division frame generated by dividing a frame into one or more frames and adding the error detection code, or the redundant frame generated so as to include the restoration information that enables the restoration of the division frame when a transmission error of the division frame occurs.

The channel selection unit 63 allocates each transmission frame and redundant frame delivered from the transmission and reception unit 64 to the appropriate frame processing unit 61 or redundant channel processing unit 62.

The redundant channel processing unit 62 restores the transmission frame based on the restoration information included in the redundant frame and the transmission frame in which an error is not detected. Only when the frame processing unit 61 detects an error in the transmission frame, the redundant channel processing unit 62 may restore the transmission frame associated with the error.

That is, when the frame processing unit 61 detects the error based on the error detection code, the redundant channel processing unit 62 restores the division frame of the data channel on which an abnormality is detected based on the restoration information included in the redundant frame and the division frame of the data channel on which an abnormality is not detected.

The frame processing unit 61 restores the client signal based on the transmission frame. The frame processing unit 61 performs an arithmetic operation on the error detection code added to the transmission frame, and determines whether or not an error has occurred. When an error is detected for a certain transmission frame, the frame processing unit 61 restores and outputs the client signal (original frame before being divided) based on the transmission frame restored by a method to be described below. Here, the method to be described below is a method of restoring the client signal based on the restoration information included in the redundant frame and the transmission frame in which the error is not detected by means of the redundant channel processing unit 62.

That is, the frame processing unit 61 performs error detection processing by using the error detection code added to the division frame delivered from the transmission and reception unit 64. The original frame is reconstructed and output based on the division frame when an error is not detected, and is reconstructed and output based on the division frame restored by using the redundant frame when an error is detected.

Figure 2:
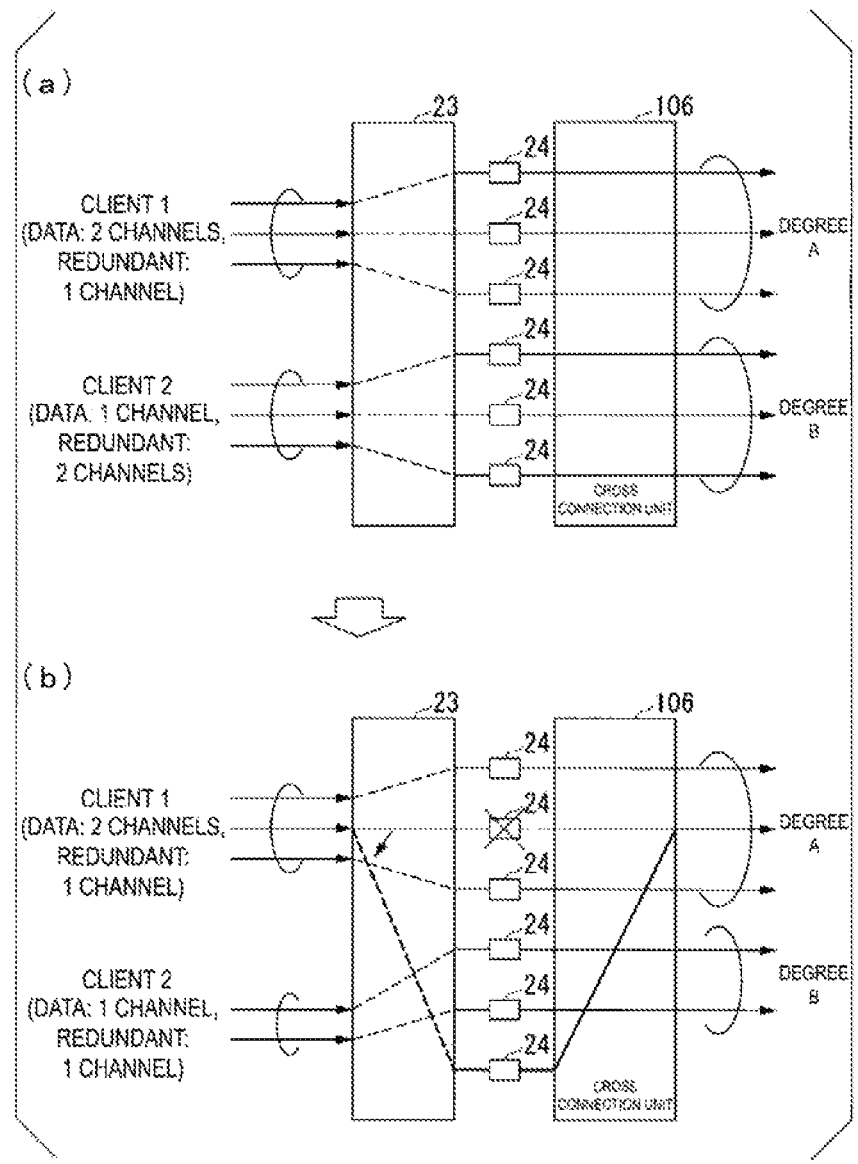
FIG. 2 is a schematic diagram illustrating a first application example of the first embodiment.

FIG. 2 is a schematic diagram illustrating a first application example of the present embodiment. FIG. 2(*a*) illustrates an initial state, and FIG. 2(*b*) illustrates a failure state. In the present diagram, it is assumed that a failure occurs at a predetermined partway point in time and thus the initial state (a) transitions to the failure state (b). In the configuration illustrated in FIG. 2, a cross connection unit 106 in the transmission line section controls a connection relationship between the transmission and reception unit 24 and a degree of an output destination.

(a) Initial State

As illustrated in FIG. 2, a plurality of client signals including data channels and redundant channels is input to the channel selection unit 23, and is output to the transmission line 101 via the transmission and reception units 24. The number of redundant channels for the data channels and the degree to which the client signals of these channels are transmitted may be different for each client signal. In the illustrated example, a client 1 and a client 2 exist. For the client 1, in the initial state, signals of two data channels and one redundant channel are output to a degree A. For the client 2, also in the initial state, signals of one data channel and two redundant channels are output to a degree B.

(b) Failure State

Here, it is assumed that a failure occurs in the transmission and reception unit of one channel of the data channels or the redundant channel of the client 1 output to the degree A. The client 1 has one redundant channel. Accordingly, when the reception-side communication node device 2 detects the occurrence of a failure and the failed channel is the data channel, the reception-side redundant channel processing unit 62 can normally restore the failed signal without causing an instantaneous interruption. At this point in time, the number of redundant channels of the client 1 is zero. However, the channel selection unit 23 re-allocates the transmission and reception unit 24 allocated to the redundant channel on the client 2 side to the client 1. Accordingly, the cross connection unit 106 changes the connection relationship. That is, the cross connection unit 106 performs control such that the allocation destination corresponding to the transmission and reception unit 24 allocated to the client 1 from the client 2 changes from the degree B to the degree A. Thus, the communication node device 1 can ensure at least one redundant channel for each of the clients 1 and 2.

Figure 3:
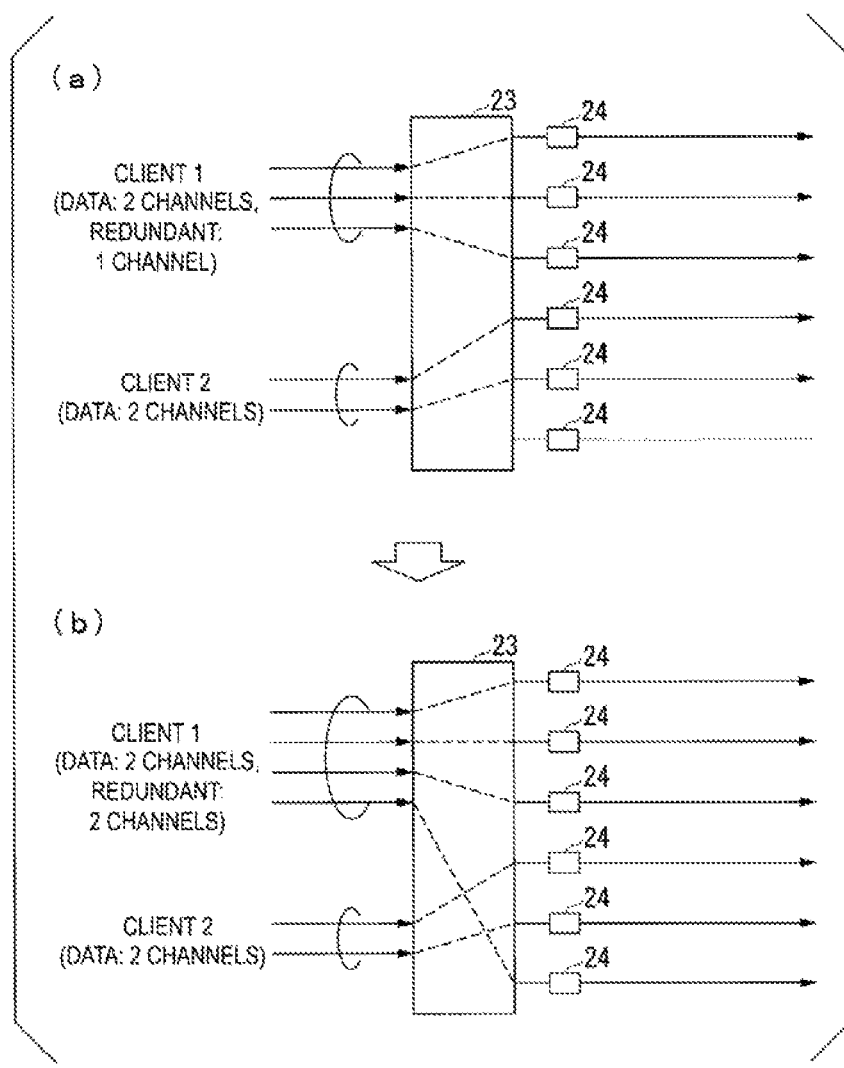
FIG. 3 is a schematic diagram illustrating a second application example of the first embodiment.

FIG. 3 is a schematic diagram illustrating a second application example of the present embodiment. In the example illustrated in this diagram, two clients having the same degree are connected to the channel selection unit 23. FIG. 3(*a*) illustrates an initial state, and FIG. 3(*b*) illustrates a transition destination state. In this diagram, it is assumed that a request to improve reliability of the client 1 is generated at a predetermined partway point in time and thus the initial state (a) transitions to the transition destination state (b).

(a) Initial State

In the initial state, the client 1 has two data channels and one redundant channel. In the initial state, the client 2 has only two data channels. In the initial state, the communication node device 1 includes one transmission and reception unit 24 (the lowermost transmission and reception unit 24 in FIG. 3(*a*)) as an available resource.

(b) Transition Destination State

Here, when the request to improve the reliability of the client 1 is generated, the transmission and reception unit 24 as the available resource can be used to satisfy the request. That is, the channel selection unit 23 performs change such that the transmission and reception unit 24 as the available resource is allocated to the client 1. Accordingly, the number of channels used by the client 1 increases, and reliability of communication related to the client 1 is improved.

As stated above, the channel selection unit 23 can apply unallocated transmission and reception units to applications for restoring failure and improving the reliability of any clients having different degrees by switching between the data channel and the redundant channel.

Second Embodiment

Next, a second embodiment will be described. Matters already described in the above embodiment may be omitted below. Here, matters specific to the present embodiment will be mainly described. It has been described in the first embodiment that one redundant channel processing unit 22 is provided for each frame processing unit 21 in a communication node device 1. It has been described that one redundant channel processing unit 62 is provided for each frame processing unit 61 in the communication node device 2.

It has been described in the first embodiment that an upper limit value of the number of redundant channels configurable for each frame processing unit 21 that accommodates each client signal is decided by the redundant channel processing unit 22. In contrast, in the present embodiment, in a transmission-side communication node device 3, a redundant channel processing group 27G including a plurality of redundant channel processing units 27 is shared by a plurality of frame processing units 21. In the present embodiment, in a reception-side communication node device 4, a redundant channel processing group 67G including a plurality of redundant channel processing units 67 is shared by a plurality of frame processing units 61.

Figure 4:
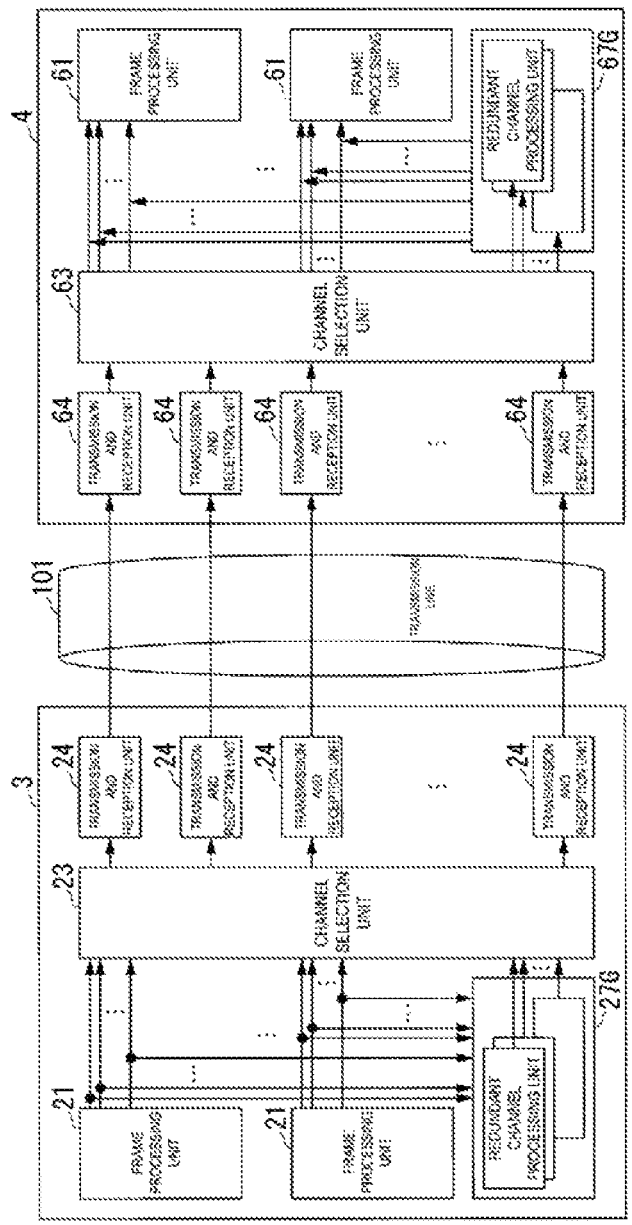
FIG. 4 is a block diagram illustrating a schematic functional configuration of a transmission system according to a second embodiment of the present invention.

FIG. 4 is a block diagram illustrating a schematic functional configuration of a transmission system according to the second embodiment. As illustrated in this diagram, the transmission system includes the transmission line 101 and the communication node devices 3 and 4 at endpoints of the transmission line 101. The communication node device 3 is a transmission-side communication node device (transmission device), and the communication node device 4 is a reception-side communication node device (reception device). Although FIG. 4 illustrates that a signal flows in only a single direction (direction from the communication node device 1 to the communication node device 2), the communication node device has functions of both the transmission side and the reception side, and thus, bi-directional communication can be easily achieved.

The communication node device 3, which is the transmission side, includes the plurality of frame processing units 21, the redundant channel processing group 27G including the plurality of redundant channel processing units 27, the channel selection unit 23, and the plurality of transmission and reception units 24.

The communication node device 4, which is the reception side, includes the plurality of frame processing units 61, the redundant channel processing group 67G including the plurality of redundant channel processing units 67, the channel selection unit 63, and the plurality of transmission and reception units 64.

The redundant channel processing group 27G includes one or more of the redundant channel processing units 27. The redundant channel processing group 27G is shared by two or more frame processing units 21. The redundant channel processing group 27G generates a number of redundant frames with the number of redundant frames generable by the redundant channel processing group 27G as an upper limit based on the division frame output by any frame processing unit 21.

The redundant channel processing group 27G has a function of selecting the redundant channel processing unit 27 in which a frame duplicated from each frame processing unit 21 is to be accommodated. With this configuration, the number of redundant channels generable from a single frame processing unit 21 is up to (number of redundant channels generable by one redundant channel processing unit 27)× (number of redundant channel processing units 27). That is, in the present embodiment, it is possible to ensure greatly increased channel redundancy compared to the case of the first embodiment. Further, the redundant channel processing unit 27 can be more efficiently used than in the case of the first embodiment by sharing the number of redundant channels between the plurality of clients.

In other respects, the functions and operations of the present embodiment are similar to those of the first embodiment.

Third Embodiment

A third embodiment will be described. Matters already described in the above embodiments may be omitted below. Here, matters specific to the present embodiment will be mainly described. A feature of the third embodiment is that a remotely located operation system configures and controls the transmission and reception unit selected by the channel selection unit and the number of redundant channels transmitted from the data channel processing unit for the division frames transmitted from the frame processing unit in the communication node device.

Figure 5:
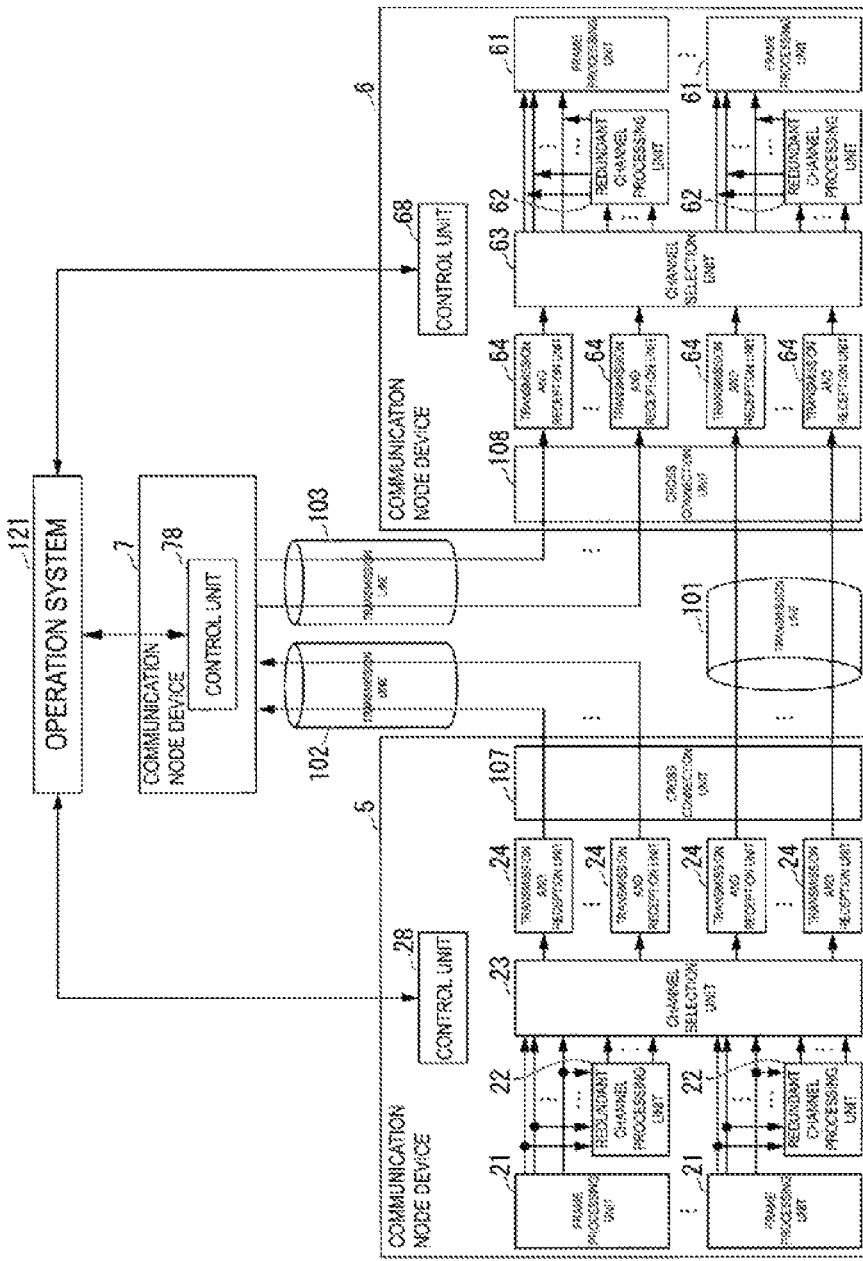
FIG. 5 is a block diagram illustrating a schematic functional configuration of a transmission system according to a third embodiment of the present invention.
Figure 6:
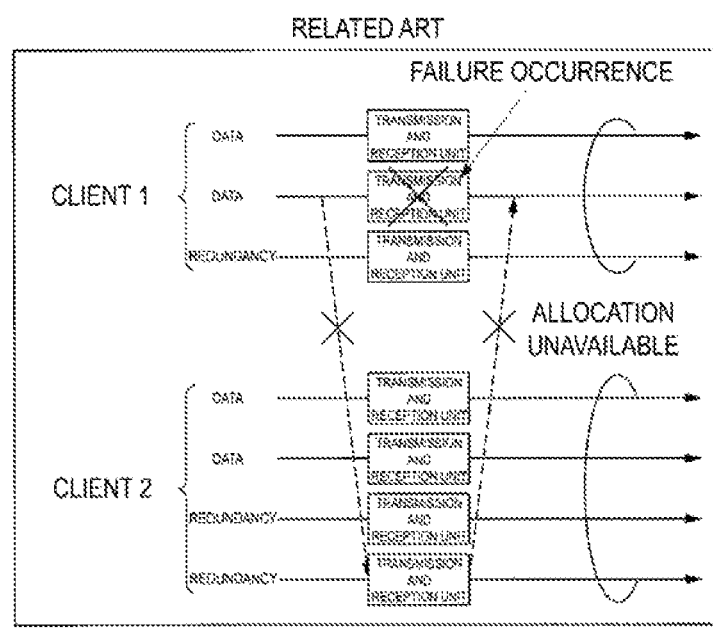
FIG. 6 is a schematic diagram illustrating an example for describing the problem according to the related art.

FIG. 5 is a block diagram illustrating a schematic functional configuration of a transmission system according to the third embodiment. As illustrated in this diagram, the transmission system includes the transmission line 101 and transmission lines 102 and 103, communication node devices 5, 6, and 7 arranged at endpoints of the transmission lines 101, 102 and 103, and an operation system 121. The transmission line 101 is a transmission line that directly connects the communication node device 5 and the communication node device 6 to each other. The transmission line 102 is a transmission line that directly connects the communication node device 5 and the communication node device 7 to each other. The transmission line 103 is a transmission line that directly connects the communication node device 7 and the communication node device 6 to each other.

The communication node device 5 is a transmission-side communication node device (transmission device), and the communication node device 6 is a reception-side communication node device (reception device).

In the present embodiment, the communication node device 7 has a role of relaying transmission of data from the communication node device 5 to the communication node device 6. In other words, a route passing through the transmission line 101 and a route passing through the transmission line 102, the communication node device 7, and the transmission line 103 exist as routes from the communication node device 5 to the communication node device 6.

The communication node device 5, which is the transmission side, includes the plurality of frame processing units 21, the plurality of redundant channel processing units 22, the channel selection unit 23, the plurality of transmission and reception units 24, a control unit 28, and a cross connection unit 107.

The communication node device 6, which is the reception side, includes the plurality of frame processing units 61, the plurality of redundant channel processing units 62, the channel selection unit 63, the plurality of transmission and reception units 64, a control unit 68, and a cross connection unit 108.

The communication node device 7 has a function as a transmission device included in the communication node device 5 and a function as a reception device included in the communication node device 6. The communication node device 7 includes a control unit 78.

The cross connection unit 107 in the communication node device 5 controls another connection of the degree of the transmission line for each of the plurality of transmission and reception units 24.

The cross connection unit 108 in the communication node device 6 controls another connection of the degree for each of the plurality of transmission and reception units 64.

A feature of the present embodiment is that the communication node device 5 includes the control unit 28, the communication node device 6 includes the control unit 68, and the communication node device 7 includes the control unit 78. The operation system 121 specific to the present embodiment performs bi-directional communication with each of the control units 28, 68, and 78. The operation system 121 may be installed at a remote location from each of the communication node devices 5, 6, and 7. The operation system 121 controls the communication node device 5, 6, and 7 via the control unit 28, 68, and 78, respectively. The specific content of the control is as follows.

Each of the control units 28, 68, and 78 of the communication node devices 5, 6, and 7 notifies the operation system 121 of an abnormality when an abnormality of the data channel is detected.

The operation system 121 receives information on the abnormality of the data channel transmitted as a notification from the control unit 28, 68, and 78. The operation system 121 externally acquires (for example, via a user interface of the operation system 121) information regarding a new configuration of the frame processing unit, an increase in bandwidth speed or a decrease in bandwidth speed, and demand for redundancy improvement. The operation system 121 decides the transmission and reception unit as the allocation destination of the division frame or the redundant frame based on the abnormal notification of the data channel, the new configuration of the frame processing unit, the increase in the bandwidth speed or the decrease in the bandwidth speed, and the demand for redundancy improvement, and configures the allocation destination in the channel selection unit. This configuration by the operation system 121 is transmitted to the control unit 28, 68, and 78 of the communication node device 5, 6, and 7, respectively, and is configured on the communication node device side.

That is, the operation system 121 controls and configures the transmission and reception unit selected by the channel selection unit in the transmission-side communication node device and the number of redundant channels transmitted from the data channel processing unit in the transmission-side communication node device for the division frames transmitted from the frame processing unit in the transmission-side communication node device.

Modification Example of Third Embodiment

As a modification example, the present embodiment and the second embodiment may be implemented in combination. In other words, in the present embodiment, the communication node device includes the redundant channel processing group. That is, each communication node device includes the redundant channel processing group (27G or 67G) in the same manner as the communication node device 3 and the communication node device 4 illustrated in FIG. 4. Each communication node device includes the control unit (28, 68, or 78) in the same manner as the communication node device 5, the communication node device 6, and the communication node device 7 illustrated in FIG. 5. The operation system 121 controls the redundant channel processing unit to which the division frames generated by each frame processing unit are to be allocated via the control unit of each communication node device.

According to the present embodiment and the modification example, the operation system 121 includes the control function, and performs various configurations and controls related to each communication node device. The operation system 121 may be provided in a remote location from the communication node device. Accordingly, it is possible to easily construct a redundant system including a plurality of channels.

At least some of the functions of the communication node device and the operation system according to the above embodiments and the modification example can be performed by a computer. In such a case, the communication node device and the operation system may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, a CD-ROM, a DVD-ROM, and a USB memory, and a storage apparatus such as a hard disk installed in a computer system. Further, the "computer-readable recording medium" may also include such a medium that stores programs dynamically for a temporary time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Furthermore, the program may be configured to perform some of the functions described above, and also may be configured to be capable of implementing the functions described above in combination with a program already recorded in the computer system.

The embodiments of the present invention have been described above in detail with reference to the drawings. However, specific configurations are not limited to those embodiments, and include any design or the like within the scope not departing from the gist of the present invention.

INDUSTRIAL APPLICABILITY

The present invention may be used, for example, for communication of data. However, the application range of the present invention is not limited to the range illustrated herein.

REFERENCE SIGNS LIST 1, 3, 5 Communication node device (transmission device)
2, 4, 6 Communication node device (reception device)
7 Communication node device
21 Frame processing unit
22 Redundant channel processing unit
23 Channel selection unit
24 Transmission and reception unit
27 Redundant channel processing unit
27G Redundant channel processing group
28 Control unit
61 Frame processing unit
62 Redundant channel processing unit
63 Channel selection unit
64 Transmission and reception unit
67 Redundant channel processing unit
67G Redundant channel processing group
68, 78 Control unit
101, 102, 103 Transmission line
106, 107, 108 Cross connection unit
121 Operation system

The invention claimed is:

1. A transmission device, comprising:
a plurality of frame processing units, each frame processing unit configured to generate division frames by dividing a frame into one or more division frames, add error detection signals to the generated division frames, respectively, and output the division frames to which the error detection signals are added to a plurality of data channels;
a redundant channel processing group including two or more redundant channel processing units and is configured to generate a number of the redundant frames wherein the number of redundant frames is generated by the redundant channel processing group as an upper limit based on the division frames output from any of the plurality of frame processing units, where at least two of the frame processing units share the redundant channel processing group, each redundant channel processing unit configured to generate, from the division frames, one or more redundant frames including restoration information that enables restoration of the division frames when an error of the division frames is detected, and output the generated redundant frame to the plurality of data channels;
a plurality of transmission and reception units, wherein each transmission and reception unit configured to output the division frames output from the frame processing unit and the redundant frames output from the redundant channel processing unit to a transmission line; and
a channel selection unit interconnected between the frame processing unit, the redundant channel processing unit and the plurality of transmission and reception units, and configured to allocate the division frames and the redundant frames to allocable transmission and reception units, wherein channel selection unit operates to redirect division frames and redundant frames from one of the plurality of transmission and reception units to any one of the plurality of transmission and reception units.

2. A transmission system, comprising:
the transmission device of claim 1;
a reception device; and
an operation system that configures a number of redundant channels transmitted from the redundant channel processing unit in the transmission device and the transmission and reception unit selected by the channel selection unit in the transmission device for the division frames transmitted from the frame processing unit in the transmission device.

* * * * *